US011893882B2

(12) United States Patent
Bai et al.

(10) Patent No.: US 11,893,882 B2
(45) Date of Patent: Feb. 6, 2024

(54) SYSTEM AND PROCESS FOR DETERMINING RECURRING AND NON-RECURRING ROAD CONGESTION TO MITIGATE THE SAME

(71) Applicant: GM Global Technology Operations LLC, Detroit, MI (US)

(72) Inventors: Fan Bai, Ann Arbor, MI (US); Donald K. Grimm, Utica, MI (US); Paul E. Krajewski, Troy, MI (US); Jiang-Ling Du, Rochester, MI (US); Mason David Gemar, Cedar Park, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 17/581,528

(22) Filed: Jan. 21, 2022

(65) Prior Publication Data

US 2023/0222897 A1 Jul. 13, 2023

Related U.S. Application Data

(63) Continuation-in-part of application No. 17/575,017, filed on Jan. 13, 2022.

(51) Int. Cl.
*G08G 1/01* (2006.01)

(52) U.S. Cl.
CPC ......... *G08G 1/0112* (2013.01); *G08G 1/0129* (2013.01); *G08G 1/0133* (2013.01)

(58) Field of Classification Search
CPC .. G08G 1/0112; G08G 1/0129; G08G 1/0133; G08G 1/0141; G08G 1/0145; G08G 1/096716; G08G 1/096775
USPC ......................... 340/933, 934, 988, 989, 990
See application file for complete search history.

(56) References Cited

U.S. PATENT DOCUMENTS

| | | | |
|---|---|---|---|
| 8,032,081 | B2 | 10/2011 | Bai et al. |
| 8,059,012 | B2 | 11/2011 | Bai et al. |
| 8,232,898 | B2 | 7/2012 | Bai et al. |
| 8,300,564 | B2 | 10/2012 | Grimm et al. |
| 8,831,869 | B2 | 9/2014 | Bai et al. |

(Continued)

FOREIGN PATENT DOCUMENTS

| | | | |
|---|---|---|---|
| DE | 102008038829 | B4 | 1/2014 |
| DE | 102012213048 | B4 | 1/2014 |

(Continued)

*Primary Examiner* — Anh V La
(74) *Attorney, Agent, or Firm* — Vivacqua Crane PLLC

(57) ABSTRACT

A system is provided for mitigating a road network congestion. The system includes a plurality of motor vehicles positioned in associated locations in a road network. Each vehicle has one or more sensors generating an input and a Telematics Control Unit (TCU) for generating at least one location signal for a location of the associated motor vehicle and at least one event signal for an event related to the associated motor vehicle, with the location signal and the event signal corresponding to a High Speed Vehicle Telemetry Data (HSVT data) based on the input from the sensors. The system further includes a computer, which communicates with a display device and the TCUs. The computer includes a processor and a computer readable medium including instructions, such that the processor is programmed to identify the congestion and determine that the congestion is a recurring or a non-recurring congestion.

13 Claims, 3 Drawing Sheets

(56) References Cited

U.S. PATENT DOCUMENTS

| | | | |
|---|---|---|---|
| 9,430,476 | B2 | 8/2016 | Bal et al. |
| 9,430,944 | B2 | 8/2016 | Grimm et al. |
| 9,475,500 | B2 | 10/2016 | Grimm et al. |
| 10,349,011 | B2 | 7/2019 | Du et al. |
| 10,838,423 | B2 | 11/2020 | Bai et al. |
| 11,127,292 | B2 | 9/2021 | Bai et al. |
| 2010/0250346 | A1 | 9/2010 | Bai et al. |
| 2011/0221901 | A1 | 9/2011 | Bai et al. |
| 2014/0222321 | A1* | 8/2014 | Petty ...................... G08G 1/012 701/533 |
| 2014/0303806 | A1 | 10/2014 | Bal et al. |
| 2015/0262198 | A1 | 7/2015 | Bai et al. |
| 2015/0245181 | A1 | 8/2015 | Bai et al. |
| 2016/0025507 | A1 | 1/2016 | Bal et al. |
| 2017/0146362 | A1 | 5/2017 | Bai et al. |
| 2017/0352262 | A1* | 12/2017 | Xu ....................... G08G 1/0133 |
| 2017/0353698 | A1 | 12/2017 | Bai et al. |
| 2019/0051168 | A1 | 2/2019 | Du et al. |
| 2019/0122541 | A1* | 4/2019 | Fowe ................... G08G 1/0133 |
| 2022/0223038 | A1* | 7/2022 | Chikamori ....... G08G 1/096775 |

FOREIGN PATENT DOCUMENTS

| | | | |
|---|---|---|---|
| DE | 102011120965 | B4 | 9/2014 |
| DE | 102015118093 | A1 | 5/2016 |
| DE | 102016105784 | A1 | 10/2016 |
| DE | 102016207076 | A1 | 11/2016 |
| DE | 102012213799 | B4 | 11/2017 |
| DE | 102011116972 | B4 | 12/2018 |
| DE | 102019114595 | A1 | 2/2020 |
| DE | 102018100112 | B4 | 10/2021 |

* cited by examiner

SYSTEM AND PROCESS FOR DETERMINING RECURRING AND NON-RECURRING ROAD CONGESTION TO MITIGATE THE SAME

CROSS REFERENCE TO RELATED APPLICATION

This application is a continuation-in-part of prior U.S. patent application Ser. No. 17/575,017, filed on Jan. 13, 2022, the entire contents of which are hereby incorporated by reference.

INTRODUCTION

The present disclosure relates to road network congestion, and more particularly to a system and a process using real-time High Speed Vehicle Telemetry data (HSVT data) collected from a city-scale of motor vehicles to identify root causes of road congestion for mitigating the same.

Transportation agencies often lack comprehensive knowledge of root causes of road congestion and an associated effect on a transportation system. Moreover, transportation agencies can lack knowledge to classify the types of road congestion active in different locations, such as recurring congestion and non-recurring congestion. Municipalities currently typically retain civil engineering consultants to conduct annual reviews and analyses to evaluate and determine fundamental roadway infrastructure faults and capacity limitations. These consultants can use partially deployed static sensors placed along roadways to conduct the annual reviews. However, a drawback of these static sensors is that the collection of data is limited in coverage (both spatially and temporally), can be time consuming and/or expensive to deploy, and often lead to mistaken recommendations due to a lack of up-to-date data.

Thus, while existing systems for mitigating road congestion achieve their intended purpose, there is a need for a new and improved system that addresses these issues.

SUMMARY

According to several aspects of the present disclosure, a system is provided for identifying, classifying, mitigating, and root-causing a road network congestion. The system includes a plurality of motor vehicles positioned in a plurality of associated locations in a road network. Each motor vehicle has one or more sensors for generating an input. Each motor vehicle further has a Telematics Control Unit (TCU) for generating at least one location signal for a location of the associated motor vehicle and at least one event signal for an event related to the associated motor vehicle, with the at least one location signal and the at least one event signal being corresponding to a High Speed Vehicle Telemetry Data (HSVT data) based on the input from the at least one sensor. The system further includes a display device and a computer, which communicates with the display device and the TCU of the associated motor vehicles. The computer includes one or more processors coupled to the TCU of the associated motor vehicles and receives the HSVT data from the TCU of the associated motor vehicles. The computer further includes a non-transitory computer readable storage medium (CRM) including instructions, such that the processor is programmed to identify the road network congestion at a current time slot based on the HSVT data. The processor is further programmed to determine that the road network congestion is a recurring congestion or a non-recurring congestion based on the HSVT data over a period of time. The processor is further programmed to determine a source of the recurring congestion and a cause of the non-recurring congestion. The processor is further programmed to generate a notification signal associated with the recurring congestion, the source and the location of the recurring congestion, the non-recurring congestion, and/or the cause and the location of the non-recurring congestion, such that the display device displays an associated one of the recurring congestion, the source and the location of the recurring congestion, the non-recurring congestion, and the cause and the location of the non-recurring congestion, in response to the display device receiving the notification signal from the processor.

In one aspect, the sensor is at least one of a GPS unit, a thermocouple, a humidity sensor, a brake sensor, an airbag sensor, an ADAS module, a perception sensor suite, and a motion sensor communicating with the TCU.

In another aspect, the processor is programmed to use a causal inference model to determine a causal relationship between a causal factor in a first location at a first time slot and the non-recurring congestion in a second location at a second time slot.

In another aspect, the processor is further programmed to use the causal inference model according to:

$$Y(p_i,t)=\Sigma_{k=1}^{P} m_k Y(p_i,t-k)+\Sigma_{k=0}^{P} n_k X(p_j,t-k)+\Sigma_{k=0}^{P} O_k \varepsilon(p_i,t-k)+\varphi$$

where $Y(p_i, t)$ represents the non-recurring congestion in the location $p_i$ at the time slot t; where $\Sigma_{k=1}^{P} m_k Y(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}^{P} n_k X(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}^{P} O_k \varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where $\varphi$ represents a random Gaussian noise.

In another aspect, the processor is further programmed to determine that the causal factor in the first location at the first time slot causes the non-recurring congestion in the second location at the second time slot according to a statistical equation:

$$\delta(X \to Y) = \frac{f(|n|, |o|)}{g(|m|)}$$

where $\delta(X \to Y)$ represents a causality determination function to determine that the non-recurring congestion event Y is caused by a contributing event X; where $f(|n|, |o|)$ represents a function operation between a weighted vector n and a weighted vector o; where n represents a weighted vector of the contributing event vector; where o represents a weighted vector of the autocorrelation function between the contributing event vector and the non-recurring congestion event; where $g(|m|)$ represents a function operation of the weighted vector m; and where m represents a weighted vector of the non-recurring congestion event.

In another aspect, the processor is further programmed to determine the source of the recurring congestion by: using an Origin-Destination Matrix (OD Matrix) derived from an historical HSVT data to determine a first route capacity estimation for a road link; using a Direct Measurement from a collection of HSVT data, e.g., collected in real-time or over a predetermined amount of time such as a full day, to determine a second route capacity estimation for the road link; comparing the first and second route capacity estimations; and calibrating the processor based on a comparison between the first and second route capacity estimations.

In another aspect, the processor is programmed to create and use the OD Matrix by: determining a Spectral Temporal-Spatio Data Extrapolation (Spectral T-S Data Extrapolation) of the historical HSVT data; determining the OD Matrix based on the Spectral T-S Data Extrapolation; determining a Route Assignment based on the OD Matrix; and determining the first route capacity estimation based on the Route Assignment and the OD Matrix.

In another aspect, the processor is further programmed to generate a Partial Origin Destination Matrix (Partial OD Matrix) and a Partial Trajectory Data based on the HSVT data. The processor is further programmed to determine the OD matrix by: determining an Origin Destination Matrix Estimation (OD Matrix Estimation) based on the Partial Trajectory Data and the HSVT data; determining a Dynamic Route Assignment and Road Capacity Estimation based on the OD Matrix Estimation; and determining a Static Route Assignment and Road Capacity Estimation based on the Partial Trajectory Data and the HSVT data.

In another aspect, the processor is further programmed to determine the Spectral T-S Data Extrapolation according to a Spectral Decomposition:

$$v_i = \underset{\|v\|=1}{\operatorname{argmax}} \|Xv\|$$

$$v_i = \underset{\|v\|=1}{\operatorname{argmax}} \left\| \left( X - \sum_{k=1}^{i-1} X v_i v_i^T \right) v \right\|$$

In another aspect, the processor is further programmed to determine the Spectral T-S Data Extrapolation according to an Object Function Formulation:

$$X^{\sim}(r) = \arg \max_{rank(\tilde{X}) \le r} \|(X - X^{\sim}(r))\|F$$

$$X^{\sim}(r) = \sum_{i=1}^{r} \sigma_i u_i v_i^T$$

In another aspect, the processor is further programmed to use an iterative approach to decrease a Mean Square Error (MSE) between the Spectral T-S Data Extrapolation and a ground truth.

According to several aspects of the present disclosure, a computer of a system is provided for identifying, classifying, mitigating, and root-causing a road network congestion. The system includes a plurality of motor vehicles positioned in a plurality of locations in a road network. Each motor vehicle includes one or more sensors for generating an input. Each motor vehicle further includes a Telematics Control Unit (TCU), which generates one or more location signals for a location of the associated motor vehicle and one or more event signals for an event related to the associated motor vehicle, with the location signal and the event signal being corresponding to a High Speed Vehicle Telemetry Data (HSVT data) based on the input from the sensor. The computer includes one or more processors coupled to the TCU of the associated motor vehicles, and the processor receives the HSVT data from the TCUs. The computer further includes a non-transitory computer readable storage medium (CRM) including instructions, such that the processor is programmed to identify the road network congestion at a current time slot based on the HSVT data. The processor is further programmed to determine that the road network congestion is a recurring congestion or a non-recurring congestion based on the HSVT data over a period of time. The processor is further programmed to determine a source of the recurring congestion and a cause of the non-recurring congestion. The processor is further programmed to generate a notification signal associated with the recurring congestion, the source of the recurring congestion, the non-recurring congestion, and/or the cause of the non-recurring congestion, such that the display device displays an associated one of the recurring congestion, the source of the recurring congestion, the non-recurring congestion, and the cause of the non-recurring congestion, in response to the display device receiving the notification signal from the processor.

In one aspect, the processor is further programmed to use a causal inference model to determine a causal relationship between the causal factor in the first location at the first time slot and the non-recurring congestion in the second location at the second time slot.

In another aspect, the processor is further programmed to use the causal inference model according to:

$$Y(p_i,t)=\Sigma_{k=1}{}^{P} m_k Y(p_i,t-k)+\Sigma_{k=0}{}^{P} n_k X(p_j,t-k)+\Sigma_{k=0}{}^{P} O_k \varepsilon(p_i,t-k)+\varphi$$

where $Y(p_i, t)$ represents the non-recurring congestion in the location $p_i$ at the time slot t; where $\Sigma_{k=1}{}^{P} m_k Y(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}{}^{P} n_k X(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}{}^{P} O_k \varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where φ represents a random Gaussian noise.

In another aspect, the processor is further programmed to determine that the causal factor in the first location at the first time slot causes the non-recurring congestion in the second location at the second time slot according to a statistical equation:

$$\delta(X \to Y) = \frac{f(|n|, |o|)}{g(|m|)}$$

where $\delta(X \to Y)$ represents a causality determination function to determine that the non-recurring congestion event Y is caused by a contributing event X; where f(|n|, |o|) represents a function operation between a weighted vector n and a weighted vector o; where n represents a weighted vector of the contributing event vector; where o represents a weighted vector of the autocorrelation function between the contributing event vector and the non-recurring congestion event; where g(|m|) represents a function operation of the weighted vector m; and where m represents a weighted vector of the non-recurring congestion event.

In another aspect, the processor is further programmed to determine the source of the recurring congestion by: using an Origin-Destination Matrix (OD Matrix) derived from an historical HSVT data to determine a first route capacity estimation for a road link; using a Direct Measurement from a collection of HSVT data to determine a second route capacity estimation for the road link; comparing the first and second route capacity estimations; and calibrating the processor based on a comparison between the first and second route capacity estimations.

According to several aspects of the present disclosure, a process of operating a system for identifying, classifying, mitigating, and root-causing a road network congestion. The system includes a plurality of motor vehicles positioned in a plurality of locations in a road network. Each motor vehicle has one or more sensors for generating an input. Each motor vehicle further includes a Telematics Control Unit (TCU), which generates one or more location signals for a location of the associated motor vehicle and one or more event signals for an event related to the associated motor vehicle, with the location signal and the event signal being corresponding to a High Speed Vehicle Telemetry Data (HSVT data) based on the input from the sensor. The system further includes a computer having one or more processors coupled to the TCU of the associated motor vehicles. The computer further has a non-transitory computer readable storage medium (CRM) including instructions. The process includes identifying, using the processor, the road network congestion at a current time slot based on the HSVT data. The process further includes determining, using the processor, that the road network congestion is a recurring congestion and/or a non-recurring congestion based on the HSVT data over a period of time. The process further includes determining, using the processor, a source of the recurring congestion or a cause of the non-recurring congestion. The process further includes generating, using the processor, a notification signal associated with the recurring congestion, the source of the recurring congestion, the non-recurring congestion, or the cause of the non-recurring congestion, such that the display device displays an associated one of the recurring congestion, the source of the recurring congestion, the non-recurring congestion, and the cause of the non-recurring congestion, in response to the display device receiving the notification signal from the processor.

In one aspect, the process further includes using, with the processor, a causal inference model to determine a causal relationship between a causal factor in a first location at the first time slot and the non-recurring congestion in a second location at a second time slot.

In another aspect, the process further includes using, with the processor, the causal inference model according to:

$$Y(p_i,t)=\Sigma_{k=1}^{P}m_kY(p_i,t-k)+\Sigma_{k=0}^{P}n_kX(p_j,t-k)+\Sigma_{k=0}^{P}O_k\varepsilon(p_i,t-k)+\varphi$$

where $Y(p_i, t)$ represents the non-recurring congestion in the location $p_i$ at the time slot t; where $\Sigma_{k=1}^{P}m_kY(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}^{P}n_kX(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}^{P}O_k\varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where φ represents a random Gaussian noise.

$$\delta(X \to Y) = \frac{f(|n|, |o|)}{g(|m|)}$$

where δ(X→Y) represents a causality determination function to determine that the non-recurring congestion event Y is caused by a contributing event X; where f(|n|, |o|) represents a function operation between a weighted vector n and a weighted vector o; where n represents a weighted vector of the contributing event vector; where o represents a weighted vector of the autocorrelation function between the contributing event vector and the non-recurring congestion event; where φ|m| represents a function operation of the weighted vector m; and where m represents a weighted vector of the non-recurring congestion event.

In another aspect, the process further includes the processor determining the source of the recurring congestion. The process further includes the processor using an Origin-Destination Matrix (OD Matrix) derived from an historical HSVT data to determine a first route capacity estimation for a road link. The process further includes the processor using a Direct Measurement from a collection of HSVT data to determine a second route capacity estimation for the road link. The process further includes the processor comparing the first and second route capacity estimations. The process further includes the processor being calibrated based on a comparison between the first and second route capacity estimations.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
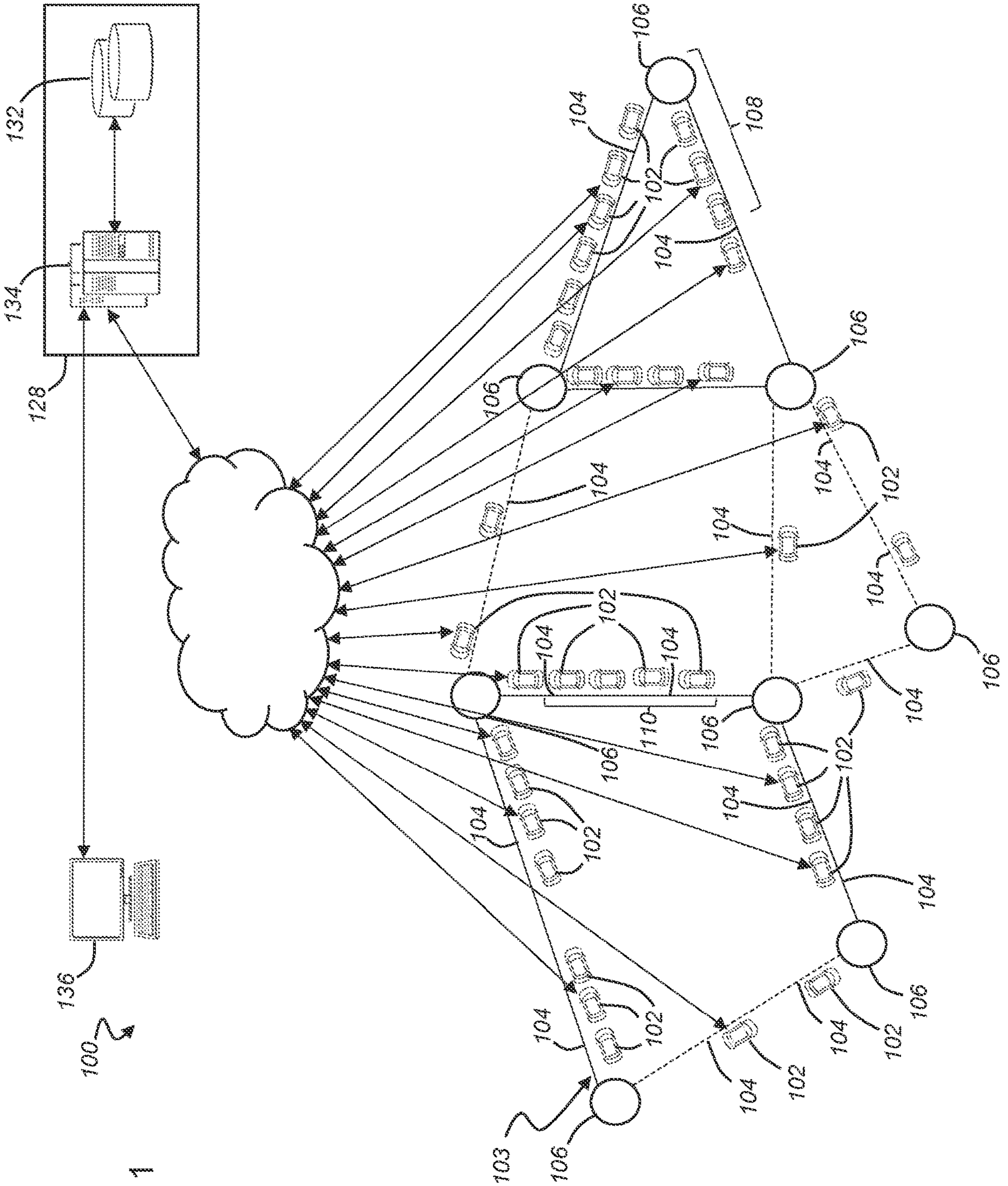
FIG. 1 is a schematic view of a road network having a plurality of road edges and a plurality of road intersections, with one example of a system including a plurality of motor vehicles travelling along the associated road edges and travelling through the associated road intersections.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIG. 1, one non-limiting example of system 100 that uses real-time High Speed Vehicle Telemetry data (HSVT data) collected from a plurality of motor vehicles 102 at a city-scale to actively identify a location of congestion, track the propagation of the congestion, and predict the evolution of congestion, such that transportation agencies can manage traffic and/or motor vehicles can take alternate routes in view of the congestion. To that end, as detailed below, the system 100 uses causality analysis and random forest analysis to identify the root causes of roadway congestion and determine whether two spatio-temporal random events have a causal relationship with other events which contributed to the formation of the congestion. In particular, the system 100 identifies non-recurring causes of congestion associated with aperiodic or random factors. Non-limiting examples of these random factors can include traffic accidents, construction zones, hazardous weather, special events (concerts, sports events, etc.), and shockwave. However, it is contemplated that non-recurring causes can be associated with any other suitable random factor. The system 100 further identifies recurring causes of congestion that are associated with fundamental roadway infrastructure faults at periodic intervals or foreseeable times, such as rush hour or evening hours. Non-limiting examples of these fundamental roadway infrastructure faults can include highway merges, insufficient road capacities, inadequate traffic controls, or faulty traffic controls. However, it is contemplated that recurring causes can be associated with any other suitable other fundamental roadway infrastructure fault. The system 100 utilizes a data-driven approach to determine the causal relationships to predict and mitigate congestion in a manner that is more accurate, more timely, and more cost-effective than the known static sensors currently used by civil engineering consultants and/or transportation agencies.

In this non-limiting example, the system 100 includes the motor vehicles 102 positioned in a plurality of locations in a road network 103 for travelling along associated road edges 104 and travelling through associated road intersections 106. As described in detail below, the system 100 can determine a congested intersection and a congested edge connected to one another form a first subgraph 108 with road congestion, and the system 100 can further determine two congested edges connected to one another form a second subgraph 110 with road congestion.

Figure 2:
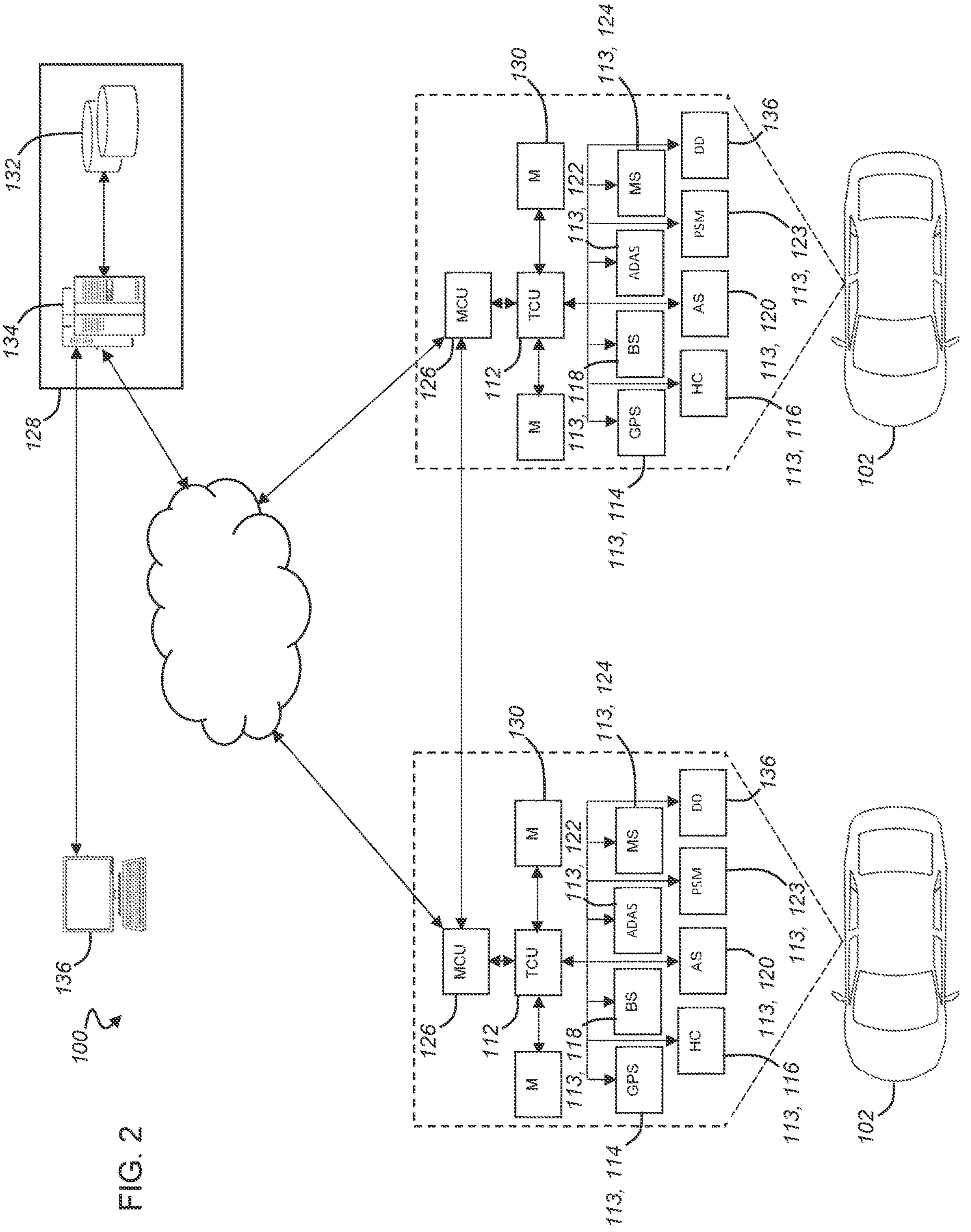
FIG. 2 is a schematic view of the system of FIG. 1, illustrating the system including the motor vehicles with associated Telematics Control Units (TCUs) and a computer communicating with the TCUs for identifying, classifying, mitigating, and root-causing a road network congestion.
Figure 3:
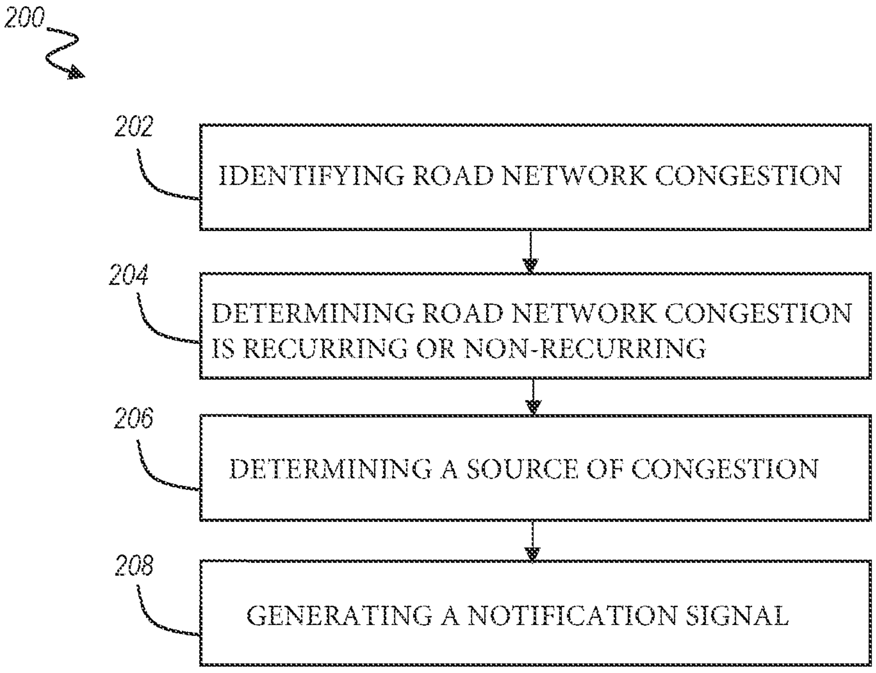
FIG. 3 is a flow chart of one non-limiting example of a process for operating the system of FIG. 1.

Referring to FIG. 2, each motor vehicle 102 includes a Telematics Control Unit 112 (TCU) for availing telematics services to generate one or more location signals for a location of the associated motor vehicle 102 and one or more event signals for an event related to the associated motor vehicle 102. The location signal and the event signal correspond to a High Speed Vehicle Telemetry Data (HSVT data) based on the input from one or more sensor s 113 described below. In this non-limiting example, the TCU 112 is a micro-controller (a complete computer on a single electronic chip), a microprocessor or field programmable gate array (FPGA). The TCU 112 wirelessly connects the associated motor vehicle 102 to cloud services or other vehicles via V2X or P2P standards over a mobile network. The TCU 112 connects and communicates with various sub-systems over data and control busses (CAN) in the motor vehicle 102 and collects telemetry data. This data includes elements, such as position, speed, engine data, and connectivity quality. It may also provide in-vehicle connectivity through WIFI and BLUETOOTH and enables an e-Call function on relevant markets. The TCU 112 communicates with suitable sensors 113 of the motor vehicle 102 for collecting telemetry data. Non-limiting examples of these components can include a GPS unit 114, which keeps track of the latitude and longitude values of the motor vehicle 102 such that the TCU 112 can generate the location signals based on the latitude and longitude values. Other non-limiting examples of these sensors 113 can include a humidity sensor 116, a brake sensor 118, an airbag sensor 120, an ADAS module 122, a perception sensor suite 123, a motion sensor 124, and one or more mobile communication units 126, and an external interface for mobile communication (GSM, GPRS, Wi-Fi, WiMax, LTE or 5G), which provides the tracked values to a centralized computer 128 or database server as described below. The motor vehicles 102 further include an amount of memory 130 for saving GPS values in case of mobile-free zones or to intelligently store information about the vehicle's sensor data.

As described in detail below, the system 100 can include a local road model with Peer-to-Peer (P2P) or edge computing that utilizes the TCU 112 of motor vehicles communicating with the TCU 112 of other motor vehicles 102. Edge computing is a distributed computing paradigm that brings computation and data storage closer to the sources of data to improve response times and save bandwidth. The system 100 can further include cloud computing with a global road model that utilizes a remote computer 128 or server. The computer 128 includes one or more processors 134 and a non-transitory computer readable storage medium 132 ("CRM") including instructions, such that the processor 134 is programmed to receive the HSVT data from the sensors 113 of the associated motor vehicles 102.

The processor 134 is further programmed to identify the road network congestion at a current time slot based on the HSVT data. More specifically, the processor 134 is further programmed to determine that the road network congestion is at least one of a recurring congestion and a non-recurring congestion based on an analysis of the HSVT data over time (e.g., days, weeks, months, etc.) to distinguish if observed congestion is part of a repeated or recurring pattern (by location, time of day, day of week, etc.). The processor 134 is programmed to use the causal inference model to determine a causal relationship between a causal factor in a first location at a first time slot and the non-recurring congestion in a second location at a second time slot according to:

$$Y(p_i,t)=\Sigma_{k=1}{}^{P} m_k Y(p_i,t-k)+\Sigma_{k=0}{}^{P} n_k X(p_j,t-k)+\Sigma_{k=0}{}^{P} O_k \varepsilon(p_i,t-k)+\varphi \quad \text{Eqn. 1}$$

where non-limiting examples of the casual factors can include, but are not limited to, weather and related road surface conditions, traffic accidents, construction zones, shock waves, police events, special sport/public/concert events, or other temporary road/lane closures; where $Y(p_i, t)$ represents the non-recurring congestion in the location $p_i$ at the time slot t; where $\Sigma_{k=1}^{P} m_k Y(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}^{P} n_k X(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}^{P} O_k \varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where $\varphi$ represents a random Gaussian noise. A person of ordinary skill in the art will understand that Eqn. 1 is one non-limiting example to show how the non-recurring congestion event could be modeled as a weighted summation of several impacting factors including: the historical non-recurring congestion event, the contributing factor event which might cause the non-recurring congestion event, the autocorrelation between non-recurring congestion event and the contributing factor event which might cause the non-recurring congestion event, as well as the random Gaussian noise. It is contemplated that other non-limiting examples or equivalents of Eqn. 1 or other modeling approaches could be used to model the non-recurring congestion event.

The processor 134 is further programmed to determine a source and a location of the recurring congestion and a cause and a location of the non-recurring congestion. The processor 134 is further programmed to determine that the causal factor in the first location at the first time slot causes the non-recurring congestion in the second location at the second time slot according to a statistical equation:

$$\delta(X \to Y) = \frac{f(|n|, |o|)}{g(|m|)} \quad \text{Eqn. 2}$$

where $\delta(X \to Y)$ represents a causality determination function to determine that the non-recurring congestion event Y is caused by a contributing event X (such as weather condition, construction zone, police event etc.); where $f(|n|, |o|)$ represents a function operation between a weighted vector n and a weighted vector o; where n represents a weighted vector of the contributing event vector (as described in Eqn. 1); where o represents a weighted vector of the autocorrelation function between the contributing event vector and the non-recurring congestion event (as described in Eqn. 1); where $g(|m|)$ represents a function operation of the weighted vector m; and where m represents a weighted vector of the non-recurring congestion event.

A person of ordinary skill in the art will appreciate that Eqn. 2 is one non-limiting example to show whether the non-recurring congestion event is caused by a given contributing factor event that could be determined by the operations of weighted factors associated with several impacting factors, including: an historical non-recurring congestion event, a contributing factor event which might cause the non-recurring congestion event, an autocorrelation between non-recurring congestion event and the contributing factor event which can cause the non-recurring congestion event, as well as the random Gaussian noise. It is contemplated that other equivalents or variants of Eqn. 2 or other modeling approaches could be used to determine that the non-recurring congestion event Y is caused by the contributing event X.

The processor 134 is further programmed to determine the source of the recurring congestion by: using an Origin-Destination Matrix (OD Matrix) derived from an historical HSVT data to determine a first route capacity estimation for a road link; using a Direct Measurement from a collection of HSVT data (e.g., historical traffic volumes and speeds) to determine a second route capacity estimation for the road link; comparing the first and second route capacity estimations; and calibrating the processor based on a comparison between the first and second route capacity estimations.

The processor 134 is further programmed to create and use the OD Matrix by: determining a Spectral Temporal-Spatio Data Extrapolation (Spectral T-S Data Extrapolation) of the historical HSVT data; determining the OD Matrix, e.g., a city-wide OD Matrix or a region-wide OD Matrix, based on the Spectral T-S Data Extrapolation; determining a Route Assignment based on the OD Matrix; and determining the first route capacity estimation based on the Route Assignment and the OD Matrix.

The processor 134 is further programmed to generate a Partial Origin Destination Matrix (Partial OD Matrix) and a Partial Trajectory Data based on the HSVT data, and the processor is further programmed to determine the OD matrix by: determining an Origin Destination Matrix Estimation (OD Matrix Estimation) based on the Partial Trajectory Data and the HSVT data; determining a Dynamic Route Assignment and Road Capacity Estimation based on the OD Matrix Estimation; and determining a Static Route Assignment and Road Capacity Estimation based on the Partial Trajectory Data and the HSVT data. The processor 134 is further programmed to determine the Spectral T-S Data Extrapolation according to a Spectral Decomposition, such as principle component analysis (PCA) or singular vector decomposition (SVD):

$$v_i = \underset{\|v\|=1}{\operatorname{argmax}} \|Xv\| \quad \text{Eqn. 3}$$

$$v_i = \underset{\|v\|=1}{\operatorname{argmax}} \left\| \left( X - \sum_{k=1}^{i-1} X v_i v_i^T \right) v \right\| \quad \text{Eqn. 4}$$

The processor 134 is further programmed to determine the Spectral T-S Data Extrapolation according to an Object Function Formulation:

$$X^{\sim}(r) = \arg \max_{rank(\tilde{X}) \le r} \|(X - X^{\sim}(r))\|F \quad \text{Eqn. 5}$$

$$X^{\sim}(r) = \sum_{i=1}^{r} \sigma_i u_i v_i^T \quad \text{Eqn. 6}$$

A person of ordinary skill in the art will appreciate that the above equations are a non-limiting examples to show spectral decomposition method that can assist with conducting the data extrapolation using partial OD matrix data. However, it is contemplated that equivalents or variants of these equations or other modeling approaches using spectral decomposition and reconstruction could be used.

The processor 134 is further programmed to use an iterative approach to decrease a Mean Square Error (MSE) between the Spectral T-S Data Extrapolation and a ground truth.

The processor 134 is further programmed to generate a notification signal associated with at least one location of recurring congestion, the source of the recurring congestion, the location of non-recurring congestion, and the cause of the non-recurring congestion, such that the display device displays the location of recurring congestion, the source of the recurring congestion, the location of non-recurring congestion, and the cause of the non-recurring congestion based on the HSVT data in response to the display device receiving the notification signal from the processor. As disclosed in U.S. patent application Ser. No. 17/575,017, (the entire contents of which are incorporated by reference), congestion is a system state identified through comparison of observed speeds and travel times on a road link versus a referenced non-congestion state derived using historical HSVT data and formally occurring when the observed traffic volume or derived flow rate reaches the road link capacity.

In one non-limiting example, the display device can be a display screen in the motor vehicle for informing the vehicle occupant of the road congestion, such that the occupant can drive the motor vehicle along an alternate route that does not have road congestion. In another non-limiting example, the display device can be a display screen in an autonomous vehicle for informing the vehicle occupant of the road congestion and indicating that the autonomous vehicle will be driven along the alternate route without the road congestion. In still another non-limiting example, the display device can be a monitor of a desktop computer utilized by a municipality for analyzing road congestion and modifying traffic control infrastructure to better manage city traffic, sending first responders to an accident event, sending snow plow trucks to clear locations of road network covered with snow, or taking any other suitable action.

Referring now to FIG. 4, one non-limiting example of a process 200 is provided for operating the system 100 of FIG. 1. The process 200 begins at block 202 with identifying, using the processor 134, the road network congestion at a current time slot based on the HSVT data.

At block 204, the process 200 further includes determining, using the processor 134, that the road network congestion is at least one of a recurring congestion and a non-recurring congestion condition based on the HSVT data.

At block 206, the process 200 further includes determining, using the processor 134, at least one of a source of the recurring congestion and a cause of the non-recurring congestion. More specifically, the process 200 can include using, with the processor 134, a causal inference model to determine a causal relationship between a causal factor in a first location at the first time slot and the non-recurring congestion in a second location at a second time slot. The process 200 can include using, with the processor 134, the causal inference model according to Equation 1 above:

The process 200 further includes determining, with the processor 134, that the causal factor in the first location at the first time slot causes the non-recurring congestion in the second location at the second time slot according to Equation 2 above.

The process 200 further includes determining, with the processor 134, the source of the recurring congestion by using, with the processor, an Origin-Destination Matrix (OD Matrix) to determine a first route capacity estimation for a road link; using, with the processor, a Direct Measurement to determine a second route capacity estimation for the road link; comparing, with the processor, the first and second route capacity estimations; and calibrating, with the processor, the processor based on a comparison between the first and second route capacity estimations.

At block 208, the process 200 further includes generating, using the processor 134, a notification signal associated with the recurring congestion, the source of the recurring congestion, the non-recurring congestion, and/or the cause of the non-recurring congestion. The display device 136 displays an associated one of the recurring congestion, the source of the recurring congestion, the non-recurring congestion, and the cause of the non-recurring congestion based on the HSVT data, in response to the display device receiving the notification signal from the processor.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMUEDGE, STATEFLOW, VISUAL BASIC, JAVA SCRIPT, PERL, HTML, TENSORFLOW, PYTHON, PYTORCH, KERAS, etc. Some of these applications may be compiled and executed on a virtual machine, such as the JAVA virtual machine, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM (also referred to as a processor readable medium) participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

In some examples, system elements may be implemented as computer readable instructions (e.g., software) on one or more computing devices, stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for identifying, classifying, mitigating, and root-causing a road network congestion, the system comprising:

a plurality of motor vehicles positioned in a plurality of associated locations in a road network, with each of the motor vehicles having at least one sensor for generating an input, and each of the motor vehicles further having a Telematics Control Unit (TCU) for generating at least one location signal for a location of the associated motor vehicle and at least one event signal for an event related to the associated motor vehicle, with the at least one location signal and the at least one event signal being corresponding to a High Speed Vehicle Telemetry Data (HSVT data) based on the input from the at least one sensor;

a display device; and a computer communicating with the display device and the TCU of the associated motor vehicles, with the computer comprising:

at least one processor coupled to the TCU of the associated motor vehicles and receiving the HSVT data from the TCU of the associated motor vehicles, wherein the at least one sensor comprises at least one of a GPS unit, a thermocouple, a humidity sensor, a brake sensor, an airbag sensor, an ADAS module, a perception sensor suite, and a motion sensor communicating with the TCU; and a non-transitory computer readable storage medium including instructions such that the at least one processor is programmed to:

identify the road network congestion at a current time slot based on the HSVT data;

determine that the road network congestion is at least one of a recurring congestion and a non-recurring congestion based on the HSVT data over a period of time;

determine a source of the recurring congestion by:

using an Origin-Destination Matrix (OD Matrix) derived from an historical HSVT data to determine a first route capacity estimation for a road link;

using a Direct Measurement from a collection of HSVT data to determine a second route capacity estimation for the road link;

comparing the first and second route capacity estimations; and calibrating the at least one processor based on a comparison between the first and second route capacity estimations;

determine a cause of the non-recurring congestion using a causal inference model to determine a causal relationship between a causal factor in a first location at a first time slot and the non-recurring congestion in a second location at a second time slot; and generate a notification signal associated with at least one of the recurring congestion, the source and the location of the recurring congestion, the non-recurring congestion, and the cause and the location of the non-recurring congestion, such that the display device displays an associated one of the recurring congestion, the source and the location of the recurring congestion, the non-recurring congestion, and the cause and the location of the non-recurring congestion based on the HSVT data in response to the display device receiving the notification signal from the at least one processor.

2. The system of claim 1 wherein the at least one processor is programmed to use the causal inference model according to:

$$Y(p_i,t)=\Sigma_{k=1}{}^{P}m_kY(p_i,t-k)+\Sigma_{k=0}{}^{P}n_kX(p_j,t-k)+\Sigma_{k=0}{}^{P}O_k\varepsilon(p_i,t-k)+\varphi$$

where $Y(p_i, t)$ represents the non-recurring congestion in the location $p_i$ at the time slot t; where $\Sigma_{k=1}{}^{P}m_kY(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}{}^{P}n_kX(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}{}^{P}O_k\varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where $\varphi$ represents a random Gaussian noise.

3. The system of claim 1 wherein the at least one processor is further programmed to determine that the causal factor in the first location at the first time slot causes the non-recurring congestion in the second location at the second time slot according to a statistical equation:

$$\delta(X \to Y) = \frac{f(|n|, |o|)}{g(|m|)}$$

where $\delta(X \rightarrow Y)$ represents a causality determination function to determine that the non-recurring congestion event Y is caused by a contributing event X; where $f(|n|, |o|)$ represents a function operation between a weighted vector n and a weighted vector o; where n represents a weighted vector of the contributing event vector; where o represents a weighted vector of the autocorrelation function between the contributing event vector and the non-recurring congestion event; where $g(|m|)$ represents a function operation of the weighted vector m; and where m represents a weighted vector of the non-recurring congestion event.

4. The system of claim 1 wherein the at least one processor is programmed to create and use the OD Matrix by:

determining a Spectral Temporal-Spatio Data Extrapolation (Spectral T-S Data Extrapolation) of a historical HSVT data;

determining the OD Matrix based on the Spectral T-S Data Extrapolation and a partial OD matrix data available;

determining a Route Assignment based on the OD Matrix; and determining the first route capacity estimation based on the Route Assignment and the OD Matrix.

5. The system of claim 4 wherein the at least one processor is programmed to generate a Partial Origin Destination Matrix (Partial OD Matrix) and a Partial Trajectory Data based on the HSVT data, and the at least one processor is further programmed to determine the OD matrix by:

determining an Origin Destination Matrix Estimation (OD Matrix Estimation) based on the Partial Trajectory Data and the HSVT data;

determining a Dynamic Route Assignment and Road Capacity Estimation based on the OD Matrix Estimation; and determining a Static Route Assignment and Road Capacity Estimation based on the Partial Trajectory Data and the HSVT data.

6. The system of claim 5 wherein the at least one processor is further programmed to determine the Spectral T-S Data Extrapolation according to a Spectral Decomposition:

$$v_i = \underset{\|v\|=1}{\operatorname{argmax}} \|Xv\|$$

$$v_i = \underset{\|v\|=1}{\operatorname{argmax}} \left\| \left( X - \sum_{k=1}^{i-1} X v_i v_i^T \right) v \right\|.$$

7. The system of claim 6 wherein the at least one processor is further programmed to determine the Spectral T-S Data Extrapolation according to an Object Function Formulation:

$$X^{\sim}(r) = \arg \max_{rank(\tilde{X}) \leq r} \|(X - X^{\sim}(r))\|F$$

$$X^{\sim}(r) = \sum_{i=1}^{r} \sigma_i u_i v_i^T.$$

8. The system of claim 7 wherein the at least one processor is further programmed to use an iterative approach to decrease a Mean Square Error (MSE) between the Spectral T-S Data Extrapolation and a ground truth.

9. A computer of a system for identifying, classifying, mitigating, and root-causing a road network congestion, the system having a plurality of motor vehicles positioned in a plurality of locations in a road network, with each of the motor vehicles having at least one sensor for generating an input, and each of the motor vehicles further having a Telematics Control Unit (TCU) for generating at least one location signal for a location of the associated motor vehicle and at least one event signal for an event related to the associated motor vehicle, with the at least one location signal and the at least one event signal being corresponding to a High Speed Vehicle Telemetry Data (HSVT data) based on the input from the at least one sensor, the computer comprising:

at least one processor coupled to the TCU of the associated motor vehicles and receiving the HSVT data from the TCU of the associated motor vehicles; and a non-transitory computer readable storage medium including instructions such that the at least one processor is programmed to:

identify the road network congestion at a current time slot based on the HSVT data;

determine that the road network congestion is at least one of a recurring congestion and a non-recurring congestion based on the HSVT data over a period of time;

determine at least one of a source of the recurring congestion and a cause of the non-recurring congestion, wherein the cause of the non-recurring congestion is determined by using a causal inference model to determine a causal relationship between a causal factor in a first location at a first time slot and the non-recurring congestion in a second location at a second time slot according to a statistical equation:

$$\delta(X \rightarrow Y) = \frac{f(|n|, |o|)}{g(|m|)}$$

where $\delta(X \rightarrow Y)$ represents a causality determination function to determine that the non-recurring congestion event Y is caused by a contributing event X; where $f(|n|, |o|)$ represents a function operation between a weighted vector n and a weighted vector o; where n represents a weighted vector of the contributing event vector; where o represents a weighted vector of the autocorrelation function between the contributing event vector and the non-recurring congestion event; where $g(|m|)$ represents a function operation of the weighted vector m; and where m represents a weighted vector of the non-recurring congestion event; and generate a notification signal associated with at least one of the recurring congestion, the source and the location of the recurring congestion, the non-recurring congestion, and the cause and the location of the non-recurring congestion, such that a display device displays an associated one of the recurring congestion, the source and the location of the recurring congestion, the non-recurring congestion, and the cause and the location of the non-recurring congestion based on the HSVT data in response to the display device receiving the notification signal from the at least one processor.

10. The computer of claim 9 wherein the at least one processor is programmed to use the causal inference model according to:

$$Y(p_i,t)=\Sigma_{k=1}^{P} m_k Y(p_i,t-k)+\Sigma_{k=0}^{P} n_k X(p_j,t-k)+\Sigma_{k=0}^{P} O_k \varepsilon(p_i,t-k)+\varphi$$

where $Y(p_i, t)$ represents the non-recurring congestion in the location $p_i$ at the time slot t; where $\Sigma_{k=1}^{P} m_k Y(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}^{P} n_k X(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}^{P} O_k \varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where $\varphi$ represents a random Gaussian noise.

11. The computer of claim 9 wherein the at least one processor is further programmed to determine the source of the recurring congestion by:

using an Origin-Destination Matrix (OD Matrix) derived from an historical HSVT data to determine a first route capacity estimation for a road link;

using a Direct Measurement from a collection of HSVT data to determine a second route capacity estimation for the road link;

comparing the first and second route capacity estimations; and calibrating the at least one processor based on a comparison between the first and second route capacity estimations.

12. A process of operating a system for identifying, classifying, mitigating, and root-causing a road network congestion, the system having a plurality of motor vehicles positioned in a plurality of locations in a road network, with each of the motor vehicles having at least one sensor for generating an input and a Telematics Control Unit (TCU) for generating at least one location signal for a location of the associated motor vehicle and at least one event signal for an event related to the associated motor vehicle, with the at least one location signal and the at least one event signal being corresponding to a High Speed Vehicle Telemetry Data (HSVT data) based on the input from the at least one sensor, the system further including a computer having at least one processor coupled to the TCU of the associated motor vehicles and a non-transitory computer readable storage medium including instructions, the process comprising:

identifying, using the at least one processor, the road network congestion at a current time slot based on the HSVT data;

determining, using the at least one processor, that the road network congestion is at least one of a recurring congestion and a non-recurring congestion based on the HSVT data over a period of time;

determining, using the at least one processor, at least one of a source of the recurring congestion and a cause of the non-recurring congestion, wherein the cause of the non-recurring congestion is determined by using a causal inference model to determine a causal relationship between a causal factor in a first location at a first time slot and the non-recurring congestion in a second location at a second time slot according to:

$$Y(p_i,t)=\Sigma_{k=1}^{P} m_k Y(p_i,t-k)+\Sigma_{k=0}^{P} n_k X(p_j,t-k)+\Sigma_{k=0}^{P} O_k \varepsilon(p_i,t-k)+\varphi$$

where $Y(p_i, t)$ represents the non-recurring congestion in the location $p_i$ at the time slot t; where $\Sigma_{k=1}^{P} m_k Y(p_i, t-k)$ represents an historical congestion in location $p_i$ at [t−K, t−1]; where $m_k$ represents a weighted vector function for element $Y(p_i, t-k)$ at time slot t−k; where Y represents a non-recurring congestion vector in an historical data; where k represents a kth historical time slot before a current time slot t; where $\Sigma_{k=0}^{P} n_k X(p_j, t-k)$ represents an historical non-recurring congestion in location $p_j$ at [t−K, t]; where $n_k$ is associated with at least one causal factor; where X represents the causal factor that contributes to a formation of a non-recurring congestion event Y; where $\Sigma_{k=0}^{P} O_k \varepsilon(p_i, t-k)$ represents an autocorrelation function between a non-recurring congestion event vector Y and a causing factor vector X, which is normally to be assumed as a normal (Gaussian) distribution $N(O, \sigma^2)$; where $O_k$ represents a weighted function for an autocorrelation function element $\varepsilon(p_i, t-k)$; where k represents the kth historical time slot before the current time slot t; and where $\varphi$ represents a random Gaussian noise;

determining, with the at least one processor, that the causal factor in the first location at the first time slot causes the non-recurring congestion in the second location at the second time slot according to a statistical equation:

$$\delta(X \to Y) = \frac{f(|n|, |o|)}{g(|m|)}$$

where $\delta(X \to Y)$ represents a causality determination function to determine that the non-recurring congestion event Y is caused by a contributing event X; where $f(|n|, |o|)$ represents a function operation between a weighted vector n and a weighted vector o; where n represents a weighted vector of the contributing event vector; where o represents a weighted vector of the autocorrelation function between the contributing event vector and the non-recurring congestion event; where $g(|m|)$ represents a function operation of the weighted vector m; and where m represents a weighted vector of the non-recurring congestion event; and generating, using the at least one processor, a notification signal associated with at least one of the recurring congestion, the source and the location of the recurring congestion, the non-recurring congestion, and the cause and the location of the non-recurring congestion, such that a display device displays an associated one of the recurring congestion, the source and the location of the recurring congestion, the non-recurring congestion, and the cause and the location of the non-recurring congestion based on the HSVT data in response to the display device receiving the notification signal from the at least one processor.

13. The process of claim 12 further comprising determining, with the at least one processor, the source of the recurring congestion by:

using, with the at least one processor, an Origin-Destination Matrix (OD Matrix) derived from an historical HSVT data to determine a first route capacity estimation for a road link;

using, with the at least one processor, a Direct Measurement from a collection of HSVT data to determine a second route capacity estimation for the road link;

comparing, with the at least one processor, the first and second route capacity estimations; and calibrating, with the at least one processor, the at least one processor based on a comparison between the first and second route capacity estimations.

* * * * *